(12) United States Patent
Nordman et al.

(10) Patent No.: US 7,692,332 B2
(45) Date of Patent: Apr. 6, 2010

(54) TRANSFER SWITCH

(75) Inventors: Russell C. Nordman, Sussex, WI (US); Kenny J. Stair, North Prairie, WI (US); Brandon Michael Batzler, Hartford, WI (US)

(73) Assignee: Briggs and Stratton Corporation, Wauwatosa, WI (US)

( * ) Notice: Subject to any disclaimer, the term of this patent is extended or adjusted under 35 U.S.C. 154(b) by 396 days.

(21) Appl. No.: 11/847,758

(22) Filed: Aug. 30, 2007

(65) Prior Publication Data

US 2009/0058191 A1 Mar. 5, 2009

(51) Int. Cl.
*H02J 9/00* (2006.01)
*H05K 1/02* (2006.01)
*H01H 9/02* (2006.01)

(52) U.S. Cl. .............................. 307/64; 307/42; 307/146

(58) Field of Classification Search .................. 307/64, 307/42, 146, 147
See application file for complete search history.

(56) References Cited

U.S. PATENT DOCUMENTS

| | | | |
|---|---|---|---|
| 6,066,817 A | 5/2000 | Flegel | |
| 6,100,604 A | 8/2000 | Morroni et al. | |
| 6,121,897 A | 9/2000 | Flegel | |
| 6,593,670 B2 | 7/2003 | Anderson | |
| 6,791,211 B1 | 9/2004 | Flegel | |
| 7,075,425 B2 | 7/2006 | Capano et al. | |
| 7,462,791 B1 * | 12/2008 | Flegel | 200/50.32 |
| 2002/0057145 A1 | 5/2002 | Kern et al. | |
| 2005/0134121 A1 | 6/2005 | Lathrop et al. | |

* cited by examiner

*Primary Examiner*—Fritz M Fleming
*Assistant Examiner*—Dru M Parries
(74) *Attorney, Agent, or Firm*—Michael Best & Friedrich LLP (57) ABSTRACT

A system for use with an electrical distribution panel having a bonded neutral connection. In some embodiments, the system includes a generator having a first bonded neutral connection and a ground fault circuit interrupter. The system also includes a neutral bus that is connected to either the bonded neutral connection of the distribution panel or the bonded neutral connection of the generator. Additionally, the system includes a switch for disconnecting the neutral bus from the bonded neutral connection of the distribution panel and connecting the neutral bus to the bonded neutral connection of the generator.

20 Claims, 5 Drawing Sheets

TRANSFER SWITCH

FIELD

The invention generally relates to power distribution. In particular, the invention relates to transfer switches used to switch between utility power and a backup power supply such as an electrical generator.

BACKGROUND

Generators are used in a variety of different environments. For example, a generator can be used as a secondary or back-up power source for a building (e.g., a residence) or as the primary power source at a construction site. Numerous other uses for a generator are possible.

Bonding the neutral wire or line of the generator to ground is required in some environments. For example, the U.S. Occupational Safety & Health Administration ("OSHA") and the U.S. National Electrical Code ("NEC") require some generators to be neutral bonded, i.e., electrically connecting the neutral line of the generator to ground. Also, it may be required to include a ground-fault-circuit interrupt ("GFCI") in some generators for detecting ground-fault current.

A circuit breaker panel of a building or residence also typically has the neutral line bonded to ground. If a generator is connected to such a circuit breaker panel, a loop is created with the neutral line of the generator and the ground line of the circuit breaker panel. This potentially induces a current through the neutral and/or ground lines, or creates multiple paths to ground, which trips the GFCI of the generator or in the building.

SUMMARY

In one embodiment, the invention is a system for use with an electrical distribution panel having a bonded neutral connection. The system includes a generator, a neutral bus, and a switch. The generator has a first bonded neutral connection and a ground fault circuit interrupter. The neutral bus is connected to either the bonded neutral connection of the distribution panel or the bonded neutral connection of the generator. The neutral bus is not connected to ground. The switch disconnects the neutral bus from the bonded neutral connection of the distribution panel and connects the neutral bus to the bonded neutral connection of the generator.

In another embodiment the invention provides a system for disconnecting electrical connections of an electrical distribution panel associated with a utility power supply and connecting a load to electrical connections associated with a generator. The system includes a switch and a ground bus. The switch disconnects one or more loads from a bonded neutral connection associated with the distribution panel and connects the one or more loads with a bonded neutral connection associated with the generator. The switch includes a first neutral terminal connected to a bonded neutral connection of the distribution panel, one or more first line terminals connected to one or more line connections of the distribution panel, a second neutral terminal connected to a bonded neutral connection of the generator, and one or more second line terminals connected to one or more line connections of the generator. The ground bus is connected to a ground connection of the distribution panel and a ground connection of the generator.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
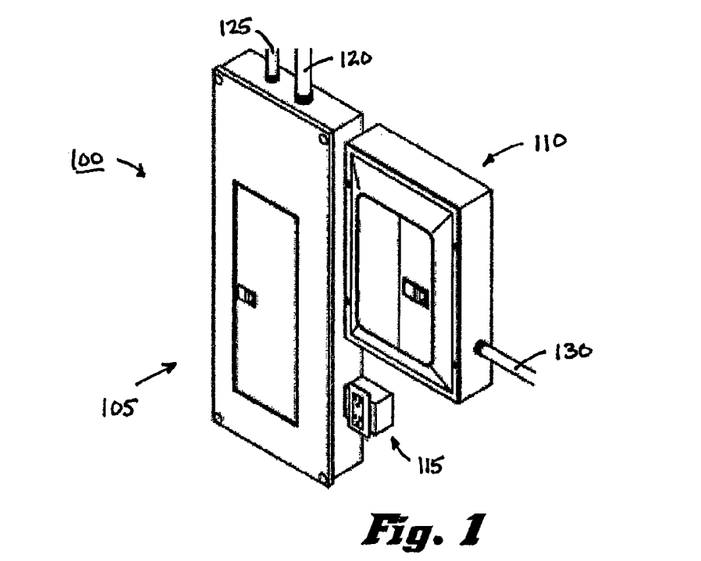
FIG. 1 illustrates a utility distribution panel and a transfer switch according to an embodiment of the invention.

FIG. 1 illustrates a power distribution system 100 having a utility distribution panel 105, a transfer switch panel 110, and an outlet 115. In some embodiments, as described in greater detail below, the power distribution system 100 can be implemented in a building (e.g., a residence, an apartment building, an office building, etc.) that is supplied with utility power via a utility service (e.g., a 100, 200, 400, or 600 amp service). Accordingly, the utility panel 105 is supplied with utility power via conductors associated with a utility service ("utility lines") within a utility conduit 120. As used herein, the terms including conductor, line, wire, cable, and the like, refer generally to a conductive or semi-conductive medium that can be used to transmit current and/or voltage, as should be appreciated by one of ordinary skill in the art. Additionally, a "hot" conductor generally refers to a conductor that carries current to a component, while a neutral conductor generally refers to a conductor that provides a return path for current. Accordingly, hot and neutral conductors are also provided to, and returned from, various outlets, lights, and other appliances in the building through a conduit 125.

In the embodiment shown in FIG. 1, the transfer switch panel 110 is positioned immediately adjacent to the utility panel 105, such that conductors can be fed directly from the utility panel 105 to the transfer switch panel 110. For example, as described in greater detail below, conductors associated with a transfer switch can be routed directly between the two panels 105 and 110. However, in some embodiments, the transfer switch panel 110 may be positioned remotely from the distribution panel 105. Accordingly, conductors required between the utility panel 105 and the transfer switch panel 110 can be routed and protected via conduit. Generally, the utility panel 105 houses components (e.g., safety components such as fuses and/or circuit breakers, one or more bus bars, etc.) that control the state of circuits associated with "non-essential" appliances or components of the residence or other building. A non-essential component is an appliance or other energy consuming device that is not required and/or desired to be operated during a utility service outage (e.g., a power outage). For example, non-essential components can include an air conditioner, a water heater, a stove or range, a dish washing machine, a clothes washing machine, and the like. The number and type of components of the building considered to be non-essential components may vary depending on the user and/or configuration and capabilities of the power distribution system 100.

The transfer switch panel 110 houses a transfer switch (described below) and one or more components (e.g., fuses and/or circuit breakers, bus bars, etc.) that control the state of circuits associated with "essential" appliances or components of the building. An essential component is an appliance or other energy consuming device that is desirable to be operable in the event of a utility service outage and that is powered by a backup power storage and/or generating device (e.g., a generator, one or more batteries, etc.) during such an event. Exemplary essential appliances include a well pump, a sump pump, one or more lights, a freezer, a refrigerator, bathroom components, a microwave, a furnace blower, and the like. The essential components may be determined by the owner or installation professional at the time of installation, and may vary from one building to another, according to the desires of the user and the capabilities of the backup power source. Additionally, the transfer switch panel 110 includes conductors that are associated with a generator, which are routed out of, or into, the transfer switch panel 110 through a generator conduit 130. As used herein, the term "generator" means an apparatus or system that converts power or energy (e.g., mechanical, chemical, thermal, etc.) into electric power or energy. Accordingly, other power sources (e.g., power supplies powered by fuel cells or solar cells) and other generator types can be used in the electric power system 100.

Figure 2:
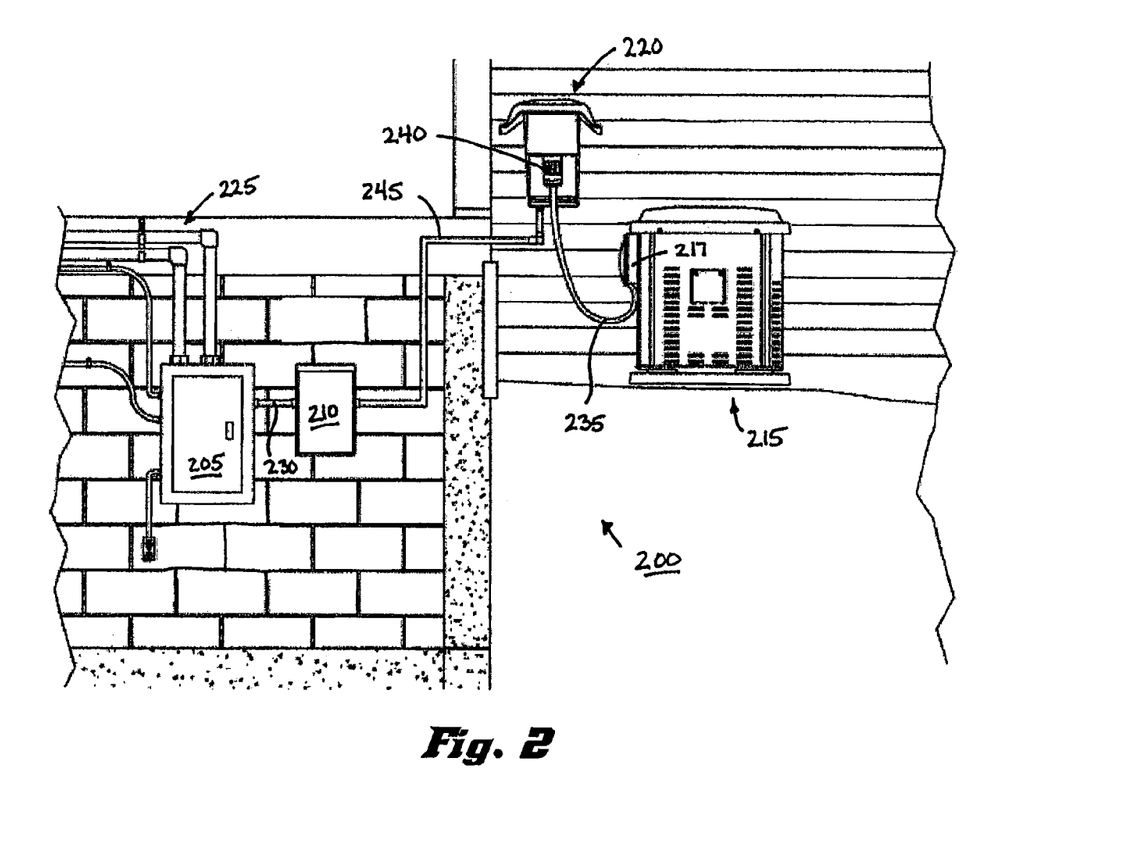
FIG. 2 illustrates a utility distribution panel and a transfer switch connected to a generator according to an embodiment of the invention.

FIG. 2 illustrates another embodiment of a power distribution system 200. In some embodiments, the power distribution system includes a main distribution or utility panel 205, a transfer switch panel 210, a generator 215, and a connection box 220. In other embodiments, the power distribution system 200 may include more or fewer components than those shown. For example, in some embodiments, connections can be made between the transfer switch panel 210 and the generator 215 directly (described below), thereby eliminating the need for the connection box 220. In the embodiment shown in FIG. 2, the power distribution system 200 is adapted to a residence.

Conductors associated with a utility service, as well as conductors that are provided to, and returned from, various outlets, lights, and other appliances in the residence, are routed through conduit 225 to the utility panel 205. In the embodiment shown in FIG. 2, the utility panel 205 is positioned in a basement of the building. However, in other embodiments, the utility panel 205 may be positioned in an alternative location (e.g., on the main floor of a building). Similar to the main panel 105 shown in FIG. 1, the utility panel 205 generally includes a plurality of circuit breakers and/or fuses that provide surge and over-current protection for non-essential devices associated with the building.

Conductors are routed between the utility panel 205 and the transfer switch panel 210 within a conduit 230. For example, conductors associated with a utility service (e.g., one or more hot conductors, a neutral conductor, a ground conductor), as well as conductors associated with components of the residence or other building can be routed through the conduit 225 and the utility panel 205 to the transfer switch panel 210 through the conduit 230. In some embodiments, these conductors are associated with a transfer switch. In the embodiment shown in FIG. 2, the utility panel 205 and the transfer switch panel 210 are positioned relatively close to one another, thereby requiring a relative short section of conduit 230. However, in other embodiments, the utility panel 205 and the transfer switch panel 210 may be positioned further from each other. For example, the transfer switch panel 210 may be positioned in an alternative area of the building, thereby requiring a longer conduit 230.

Generally, the transfer switch panel 210 includes fuses and/or circuit breakers associated with essential devices of the building. Additionally, as described in greater detail below, the transfer switch panel includes a transfer switch for transferring loads from the utility service (being fed into the utility panel 205) to the generator 215. In some embodiments, the generator 215 is a portable generator that can be relatively easily moved from one location to another. In other embodiments, the generator 215 may be a relatively permanent generator. For example, the generator 215 may be a 1.5 KW to a 60 KW generator, depending on the number and power requirements of the essential devices. The generator generates electricity by conventional and known methods. In some embodiments, the generator 215 includes a ground fault circuit interrupter ("GFCI") component 217, which, as described in greater detail below, is a safety device that is included to detect ground-fault currents. Additionally, the generator 215 can include a bonded neutral conductor. A bonded neutral conductor refers generally to a neutral conductor that is electrically connected to ground.

In some embodiments, the connection box 220 is positioned in a predetermined location that is relatively proximate to the generator 215, such as an exterior wall of the building. The connection box 220 allows hot, neutral, and ground conductors 235 from the generator 215 to be connected to, and disconnected from, a transfer switch (housed in the transfer switch panel 210) relatively easily. For example, the conductors 235 associated with the generator 215 can be connected to (and disconnected from) a receiving component included in the connection box 220 using a plug component 240. In some embodiments, the plug component 240 is a standard, four wire (e.g., two hot conductors, a neutral conductor, and a ground conductor), male-type, 240 volt plug, while the receiving component is configured to receive the plug component 240. The receiving component includes relatively permanent electrical connections with the conductors associated with the transfer switch that is housed in the transfer switch panel 210. The conductors are routed through conduit 245.

Figure 3:
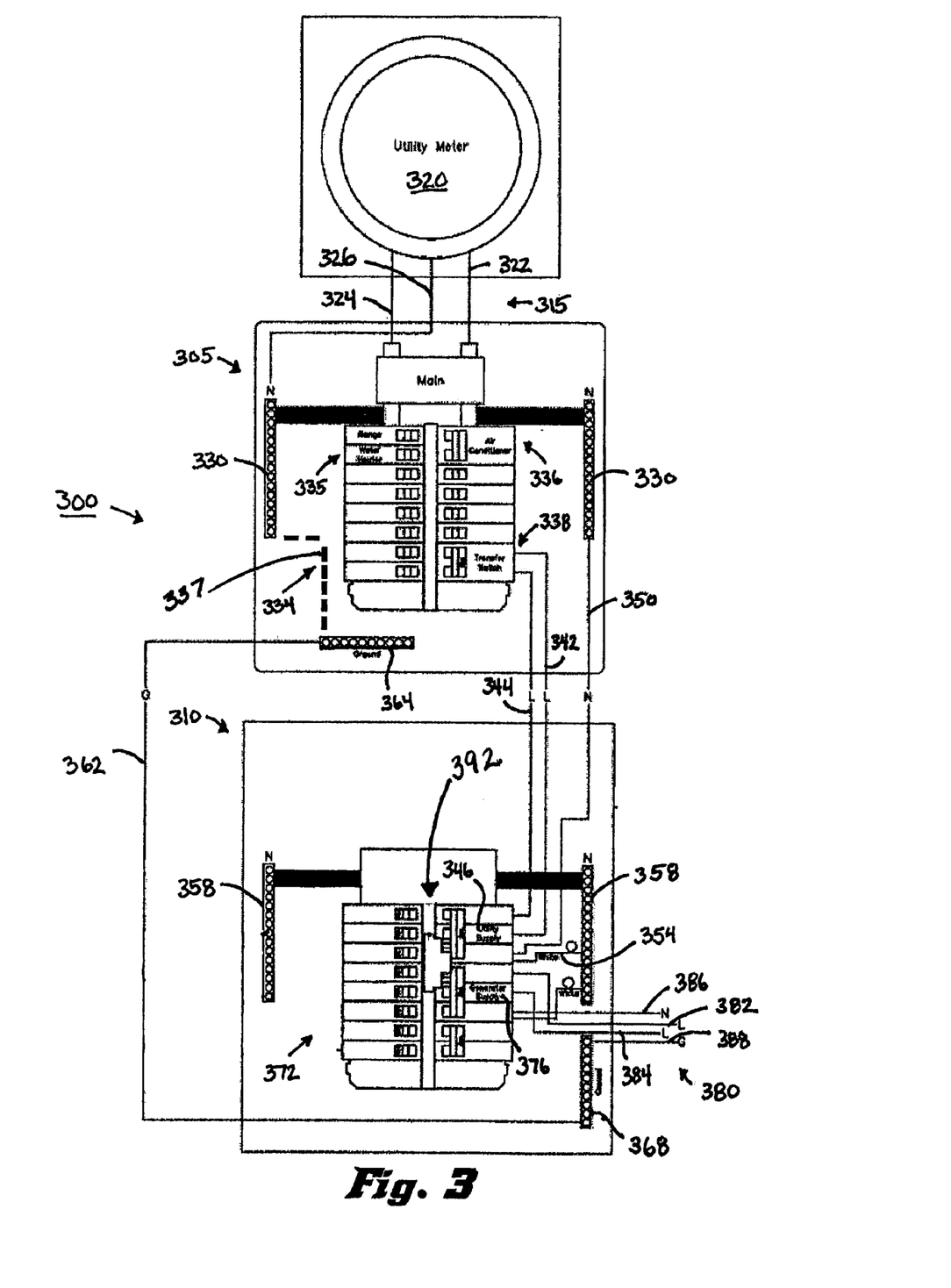
FIG. 3 illustrates connections between a utility distribution panel and a transfer switch according to an embodiment of the invention.

FIG. 3 illustrates at least a portion of a power distribution system 300 that includes connections between a utility distribution panel 305 and a transfer switch panel 310. In some embodiments, the utility panel 305 and the transfer switch panel 310 are positioned or installed in a building such as a residence.

The utility panel 305 is supplied with utility power via utility conductors 315 from a utility source or service 320. Generally, the utility conductors 315 include a first utility line 322, a second utility line 324, and a neutral line 326. Generally, there is a potential difference of approximately 240 volts between the first and second lines 322 and 324, or a potential difference of approximately 120 volts between either of the first or second utility lines 322 and 324 and the neutral line 326. In other embodiments, however, the potential differences associated with the lines may be different.

The utility panel 305 includes a pair of neutral bus bars 330, as well as a pair of line or hot bus bars that are positioned beneath a plurality of circuit breaker components 334. In other embodiments, an alternative number of bus bars (e.g., one, three, etc.) may be implemented for providing neutral and hot connections. For example, the bus bars are generally a metallic element (or an element comprising another conductive material) that provides a contact area for one or more circuit connections to be made. The neutral bus bars 330 are connected to the neutral line 326, and thus, are also bonded via line 337. The hot bus bars are connected to the first and second utility lines 322 and 324, such that the hot bus bars are at the same potential as the first and second utility lines 322 and 324.

The circuit breaker components 334 of the utility panel 305 are also connected to the hot bus bars. For example, as shown in FIG. 3, a one pole circuit breaker 335 (e.g., a 15 amp circuit breaker) is connected to one of the hot bus bars, while a two pole circuit breaker 336 (e.g., a 30 amp circuit breaker) is connected to both of the hot bus bars. As should be appreciated by one of ordinary skill in the art, in other embodiments, alternatively sized circuit breakers (e.g., circuit breakers from 10 amps to 200 amps) may be used. Each of the circuit breaker components 334 are also generally connected to a non-essential component of the residence (previously described) via a hot conductor, while a neutral conductor connects the non-essential components of the building back to one of the neutral bus bars 330. Connecting the components in this way completes a circuit and provides power to the component when the circuit breaker component is in the ON or closed position. The circuit can be interrupted by switching the circuit breaker component to the OFF or open position. The state (e.g., ON or OFF) of the circuit breaker components 334 can be altered manually (e.g., by a user) or automatically (e.g., in the event of an over-current condition), as should be appreciated by one of ordinary skill in the art.

One of the circuit breaker components 334 included in the utility panel 305 is designated as a transfer switch circuit breaker 338. In the embodiment shown in FIG. 3, the transfer switch circuit breaker 338 is a two-pole, 50 amp circuit breaker that connects the utility lines 322 and 324 from the utility panel 305 to the transfer switch panel 310. For example, conductors including a first transfer switch line 342 and a second transfer switch line 344, which are connected to the first and second utility lines 322 and 324 via the hot bus bars positioned beneath the transfer switch circuit breaker 338, are connected to a utility supply circuit breaker 346 located in the transfer switch panel 310. Additionally, the utility supply circuit breaker 346 is connected to two hot bus bars that are positioned beneath the utility supply circuit breaker 346 (described in greater detail below), thereby completing a connection from the first and second utility lines 322 and 324 to the hot bus bars of the transfer switch panel 310. For utility power to be available in the transfer switch panel 310, both the transfer switch circuit breaker 338 (of the utility panel 305) and the utility supply circuit breaker 346 (of the transfer switch panel 310) must be in the ON or closed position.

A transfer switch neutral line 350 is also connected between one of the neutral bus bars 330 associated with the utility panel 305 to the utility supply circuit breaker 346 in the transfer switch panel 310. An additional neutral line 354 connects the utility supply circuit breaker 346 to a neutral bus bar 358 (one of the pair) associated with the transfer switch panel 310. Providing this additional neutral line 354 allows the neutral bus bars 358 of the transfer switch panel 310 to be connected to the utility bus bars 330 of the utility panel 305 when the utility supply circuit breaker 346 is in the ON or closed position. However, as described in greater detail below, the neutral bus bars 358 of the transfer switch panel 310 may alternatively be connected to a neutral conductor of a generator when the utility supply circuit breaker 346 is in an OFF or open position. Additionally, a ground conductor 362 can be connected between a ground bus 364 located in the utility panel 305 and a second ground bus 368 located in the transfer switch panel.

The transfer switch panel 310 also includes a plurality of general circuit breakers 372 that are associated with essential components (as previously described) of the building. For example, the circuit breakers 372 are connected to one or more of the hot bus bars that are positioned beneath the circuit breakers 372, as well as the essential components of the building. The essential components of the building are also connected to the neutral bus bars 358, thereby completing a circuit, and providing power to the components of the building when the circuit breakers 372 are in the ON position. As described in greater detail below, the components connected to circuit breakers in the transfer switch panel can be powered by either the utility service 320 or a generator, while the components connected to the circuit breakers in the utility panel can only be powered by the utility service 320.

The transfer switch panel 310 also includes a generator supply circuit breaker 376. In addition to being connected to the hot bus bars of the transfer switch panel 310, the generator supply circuit breaker 376 is connected to conductors 380 associated with a generator. In some embodiments, the generator conductors 380 include a first generator line 382, a second generator line 384, a grounded neutral line 386, and a ground line 388. Thus, when the generator supply circuit breaker 376 is in the ON or closed position, the hot bus bars and the neutral bus bars 358 of the transfer switch panel 310 are connected to the conductors 380 associated with the generator. When the generator supply circuit breaker 376 is in the OFF or open position, the hot bus bars and the neutral bus bars 358 of the transfer switch panel 310 are connected to the conductors associated with the utility panel 305 and the utility service 320 (e.g., the first and second transfer switch lines 342 and 344, and the neutral line 350).

In some embodiments, the utility supply circuit breaker 346 and the generator supply circuit breaker 376 operate together as a transfer switch 392. The transfer switch 392 can be used to change, or "switch," the supply of power for the building circuits associated with the transfer switch panel 310 from power that is generated by the utility service 320 to power that is generated by the generator. Additionally, the transfer switch 392 can be used to switch the neutral connection of components of the building from the utility bonded neutral line 326 to the generator bonded neutral line 386. This "neutral switching" allows the generator to be equipped with a GFCI, as described in greater detail below.

When the transfer switch 392 is located in a utility supply position, power is supplied to the components of the residence by the utility 320, the transfer switch circuit breaker 338 (in the utility panel 305) is in the ON or closed position, the utility supply circuit breaker 346 (in the transfer switch panel 310) is in the ON or closed position, and the generator supply circuit breaker 376 (in the transfer switch panel 310) is in the OFF or open position. Accordingly, as described above, the hot bus bars associated with the utility panel 305 and the hot bus bars associated with the transfer switch panel 310 are all at the same potential as the first and second utility lines 322 and 324. Additionally, the neutral bus bars 330 of the utility panel 305 and the neutral bus bars 358 of the transfer switch panel 310 are connected to, and are at the same potential as, the bonded neutral line 326 associated with the utility service 320. When the transfer switch 392 is actuated to a generator supply position, the utility circuit breaker 346 is switched to the OFF or open position, while the generator supply circuit breaker 376 is switched to the ON or closed position. Positioning the utility circuit breaker 346 in the OFF position isolates the transfer switch panel 310 from the utility panel 305 (e.g., the transfer switch panel 310 is no longer electrically connected to the utility panel 305), with the exception of the ground line 362. Additionally, positioning the generator supply circuit breaker 376 to the ON position connects the hot bus bars and the neutral bus bars 358 of the transfer switch panel 310 to the conductors 380 associated with the generator. Thus, the essential components of the building, which are coupled to the circuit breakers 372, are now powered by the generator.

Actuating the transfer switch 392 disconnects the components associated with the transfer switch panel 310 (e.g., the circuits connected to the circuit breakers 372) from the utility power supply, and connects the circuits associated with the transfer switch panel 310 to the generator power supply. Additionally, the transfer switch 392 allows the neutral connection of the neutral bus bars 358 in the transfer switch panel 310 to be switched from the bonded neutral line 326 associated with the utility service 320 (via the neutral line 350) to the bonded neutral line 386 associated with the generator (via the additional neutral line 354). In some embodiments, the neutral connection must be switched to allow for a generator having a GFCI. For example, if the neutral connection is not switched (e.g., the generator bonded neutral is directly connected to the utility panel), a loop is created with the neutral line of the generator and the ground of the utility panel, which potentially creates multiple paths to ground and/or induces a current flow through the ground or neutral lines. Some GFCIs test for a grounded neutral connection in which a low resistance path exists downstream between neutral and ground conductors. Thus, multiple paths to ground and/or an induced current flow may cause the GFCI to "trip" or disconnect the generator power supply from the transfer switch panel 310 almost immediately. Switching the neutral connection avoids creating a current inducing loop, thereby avoiding such GFCI faults. Thus, the invention permits generators having GFCIs to be used as backup power sources for residences and other buildings.

Figure 4A:
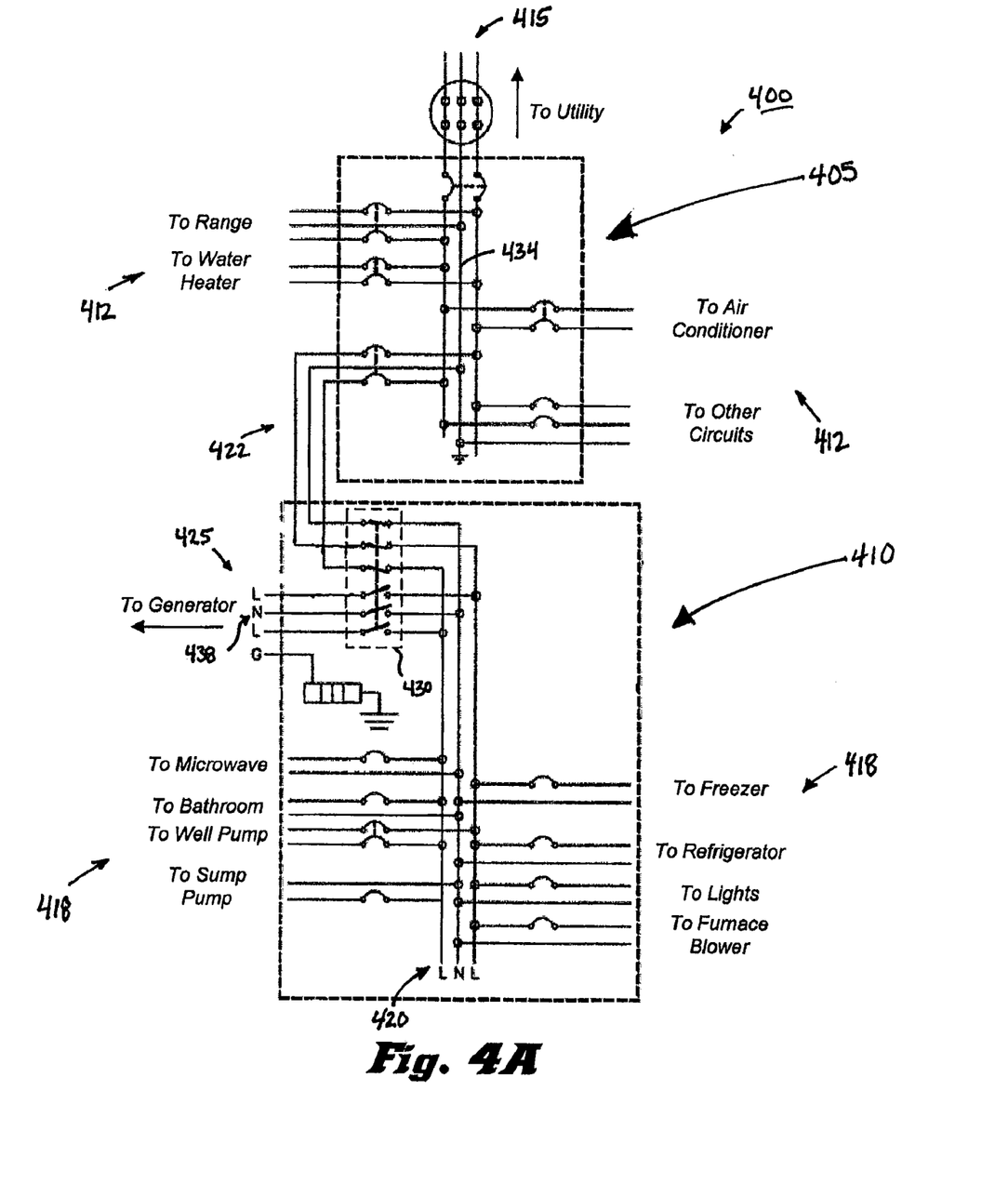
FIG. 4A illustrates connections between a utility distribution panel and a transfer switch in a Utility mode according to an embodiment of the invention.
Figure 4B:
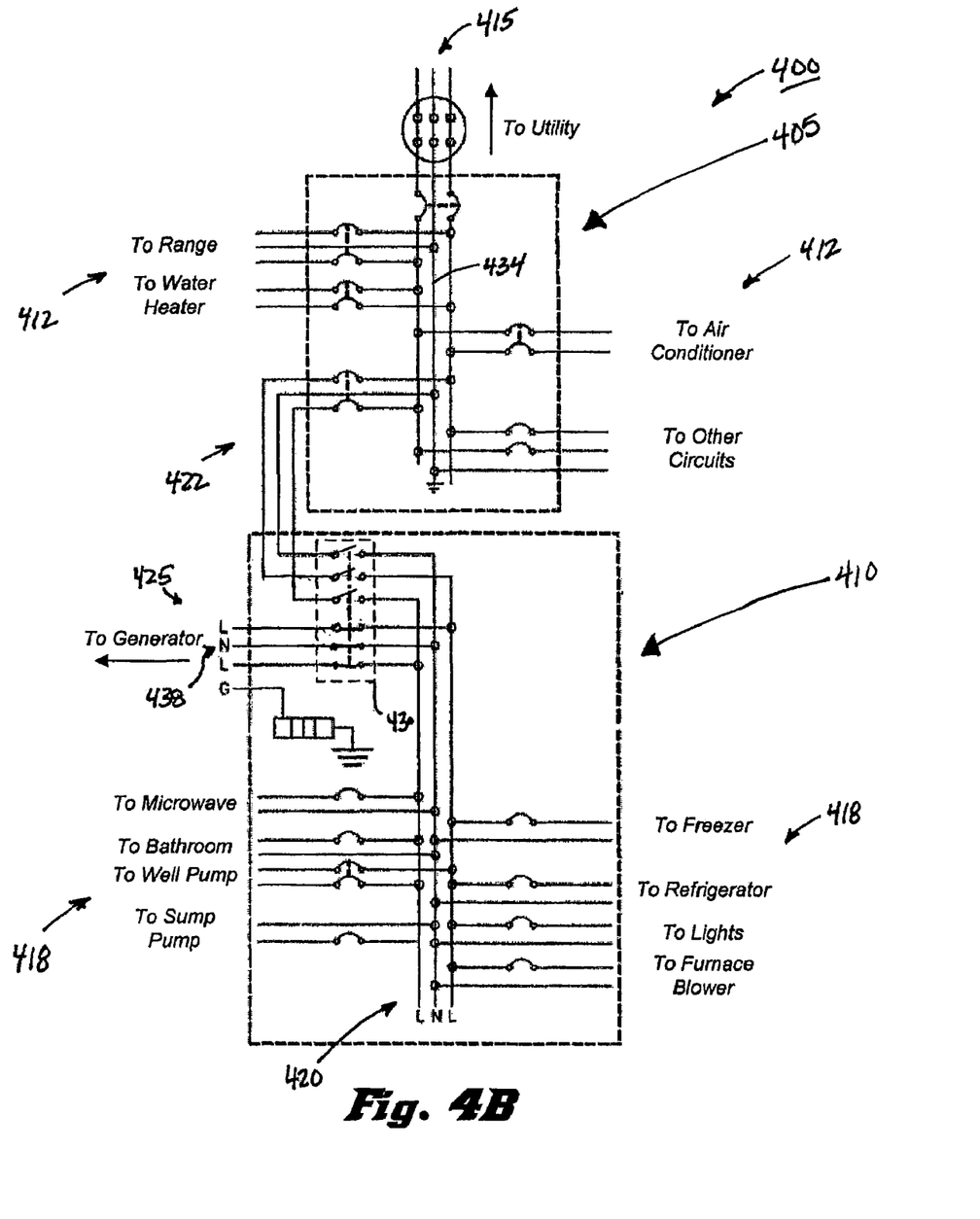
FIG. 4B illustrates connections between a utility distribution panel and a transfer switch in a Backup mode according to an embodiment of the invention.

FIGS. 4A and 4B illustrate a schematic 400 that includes electrical connections associated with a utility distribution panel 405 and a transfer switch panel 410. For example, the schematic 400 illustrates connections between circuit breaker devices associated with non-essential loads 412 and utility conductors 415, as well as connections between circuit breaker devices associated with essential loads 418 and transfer switch conductors 420. The transfer switch conductors 420 can be connected to either the utility service conductors 415 (via intermediate conductors 422) or conductors associated with a generator 425 ("generator conductors"). Transfer switch 430 prevents the inadvertent connection of the utility and generator power sources. As described in greater detail below, a transfer switch 430 can be actuated to disconnect the transfer switch conductors 420 (and, therefore, the essential loads 418) from the utility service conductors 415, and connect the transfer switch conductors 420 to conductors 438 associated with a generator.

FIG. 4A illustrates the transfer switch 430 positioned in a utility service state. When the transfer switch 430 is positioned in the utility service state, the non-essential loads 412 are connected to, and powered by, the utility service conductors 415. Additionally, the transfer switch conductors 420 (and, therefore, the essential loads 418) are connected to, and powered by, the utility service conductors 415 (via intermediate conductors 422). In some embodiments, one of the utility service conductors 415 is a utility bonded neutral conductor 434. Accordingly, when the transfer switch 430 is positioned in a utility service state, the essential loads 418 are connected to the utility bonded neutral conductor 434.

FIG. 4B illustrates the transfer switch 430 positioned in a generator service state. The generator service state is generally used when the utility service is unavailable. When the transfer switch 430 is positioned in the generator service state, the transfer switch conductors 420 (and, therefore, the essential loads 418) are disconnected from the intermediate conductors 422 and utility service conductors 415. Additionally, the transfer switch conductors 420 are connected to, and powered by, the generator conductors 425. In some embodiments, one of the generator conductors 425 is a generator bonded neutral conductor 438. Accordingly, when the transfer switch 430 is positioned in a utility service state, the essential loads 418 are connected to the generator bonded neutral conductor 438.

Isolating the essential loads 418 from the utility bonded neutral conductor 434 when the transfer switch 430 is positioned in the generator service state eliminates the possibility of creating a loop between the utility bonded neutral conductor 434 and the generator bonded neutral conductor 438. Accordingly, inadvertent connection of utility and generator sources can be avoided.

Figure 5:
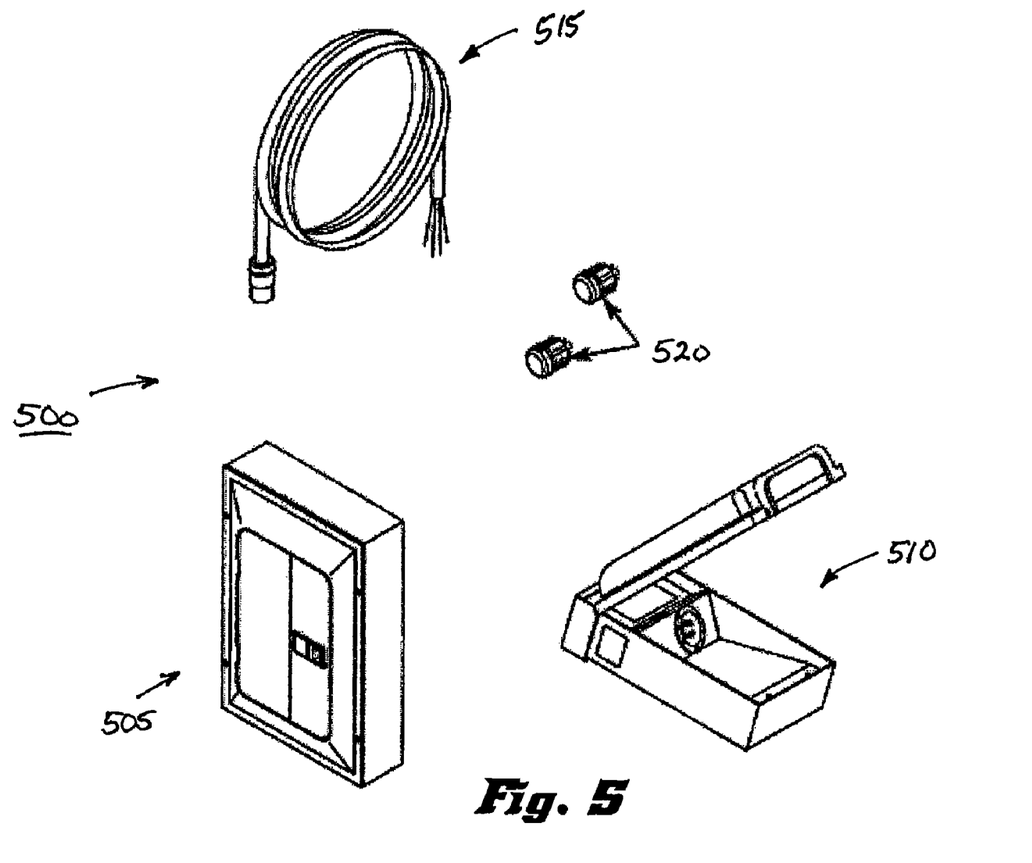
FIG. 5 illustrates a switching neutral package according to an embodiment of the invention.

FIG. 5 illustrates a switching neutral component package 500 according to an embodiment of the invention. In the embodiment shown in FIG. 5, the switching neutral package 500 includes a transfer switch panel 505, a connection box 510, a connecting cord 515, and connecting plugs 520. In other embodiments, however, more or fewer components can be included in the switching neutral package 500 than those shown. For example, in some embodiments, the switching neutral package 500 may only include the transfer switch panel 505 and the connecting cord 515.

The transfer switch panel 505 includes a transfer switch having a utility service circuit breaker component and a generator service circuit breaker component (e.g., the transfer switch 392 shown in FIG. 3, or the transfer switch 430 shown in FIGS. 4A and 4B). The transfer switch panel 505 may also include one or more hot bus bars, one or more neutral bus bars, and a ground bus. In some embodiments, the transfer switch panel 505 is installed in a building at the same time as a utility panel. For example, the transfer switch panel 505 and the utility panel can be installed in the building immediately after construction of the building. In other embodiments, the transfer switch panel 505 is installed subsequent to installation of the utility panel. For example, the transfer switch panel 505 may be installed in the building with an existing utility service as a backup upgrade.

The connection box 510, the connecting cord 515, and the connecting plugs 520 are generally used to connect the transfer switch (within the transfer switch panel 505) to a generator. For example, relatively permanent conductors can be connected between the transfer switch and the connection box 510, which is mounted to an exterior surface of the building in which the transfer switch is installed (e.g., the connection box 220 shown in FIG. 2). Additionally, the connecting cord 515, to which the connecting plugs 520 are coupled, can be connected between the connection box 510 and the generator. Accordingly, the connection box 510, connecting cord 515, and connecting plugs 520 provide an intermediate connection mechanism between the transfer switch and the generator. As such, the generator can be relatively easily disconnected from the transfer switch in the event of a generator relocation.

Various features and embodiments of the invention are set forth in the following claims.

What is claimed is:

1. A system configured to be used with an electrical distribution panel having a bonded neutral conductor, the system comprising:
   a generator having a first bonded neutral conductor and a ground fault circuit interrupter;
   a neutral bus configured to be electrically connected to either the bonded neutral conductor of the distribution panel or to the bonded neutral conductor of the generator, the neutral bus not being electrically connected to ground; and
   a switch configured to electrically disconnect the neutral bus from the bonded neutral conductor of the distribution panel and to electrically connect the neutral bus to the bonded neutral conductor of the generator.

2. The system of claim 1, further comprising a second panel configured to house the neutral bus and the switch.

3. The system of claim 2, wherein the second panel is configured to be positioned proximate to the electrical distribution panel.

4. The system of claim 2, wherein the second panel includes one or more breaker switches configured to be connected to at least one load and to the neutral bus.

5. The system of claim 1, further comprising a plug associated with the generator, the plug configured to receive at least one line conductor, the bonded neutral conductor, and a ground conductor of the generator.

6. The system of claim 5, further comprising an intermediate connection assembly positioned proximate to the generator and configured to receive the plug and provide connections to a panel positioned remotely from the generator.

7. The system of claim 1, further comprising a ground bus configured to be electrically connected to a ground conductor of the distribution panel and to a ground conductor associated with the generator.

8. The system of claim 1, wherein the switch is configured to be manually actuated by a user.

9. The system of claim 1, wherein the switch includes at least one associated fuse assembly.

10. The system of claim 9, wherein the fuse assembly is a breaker device rated for approximately 30 to 50 amps.

11. A system configured to disconnect electrical connections of an electrical distribution panel associated with a utility power supply and to connect to electrical connections associated with a generator, the system comprising:
    a switch configured to electrically disconnect at least one load from a bonded neutral conductor associated with the distribution panel and to electrically connect the at least one load with a bonded neutral conductor associated with the generator, the switch comprising;
       a first neutral terminal configured to be electrically connected to a bonded neutral conductor of the distribution panel;
       one or more first line terminals configured to be electrically connected to at least one line conductor of the distribution panel;
       a second neutral terminal configured to be electrically connected to a bonded neutral conductor of the generator;
       at least one second line terminal configured to be electrically connected to at least one line conductor of the generator; and
    a ground bus configured to be electrically connected to a ground conductor of the distribution panel and to a ground conductor of the generator.

12. The system of claim 11, further comprising a neutral bus configured to be electrically connected to the switch.

13. The system of claim 12, wherein the neutral bus is not electrically connected to ground.

14. The system of claim 11, wherein the switch includes at least one fuse assembly.

15. The system of claim 14, wherein the at least one fuse assembly is a breaker device rated for approximately 30 to 50 amps.

16. The system of claim 11, wherein the switch is housed in a second panel separated from the electrical distribution panel associated with the utility power supply.

17. The system of claim 11, wherein the switch is configured to be manually actuated by a user.

18. The system of claim 11, further comprising a panel configured to house the switch, and wherein the panel is configured to be positioned adjacent to the electrical distribution panel.

19. The system of claim 11, further comprising an intermediate connection assembly positioned proximate to the generator and configured to receive the at least one line conductor and the bonded neutral conductor of the generator, and to provide intermediate line conductors and an intermediate bonded neutral conductor to the switch.

20. The system of claim 11, wherein the switch is configured to be manually actuated by a user.

* * * * *